UNITED STATES PATENT OFFICE.

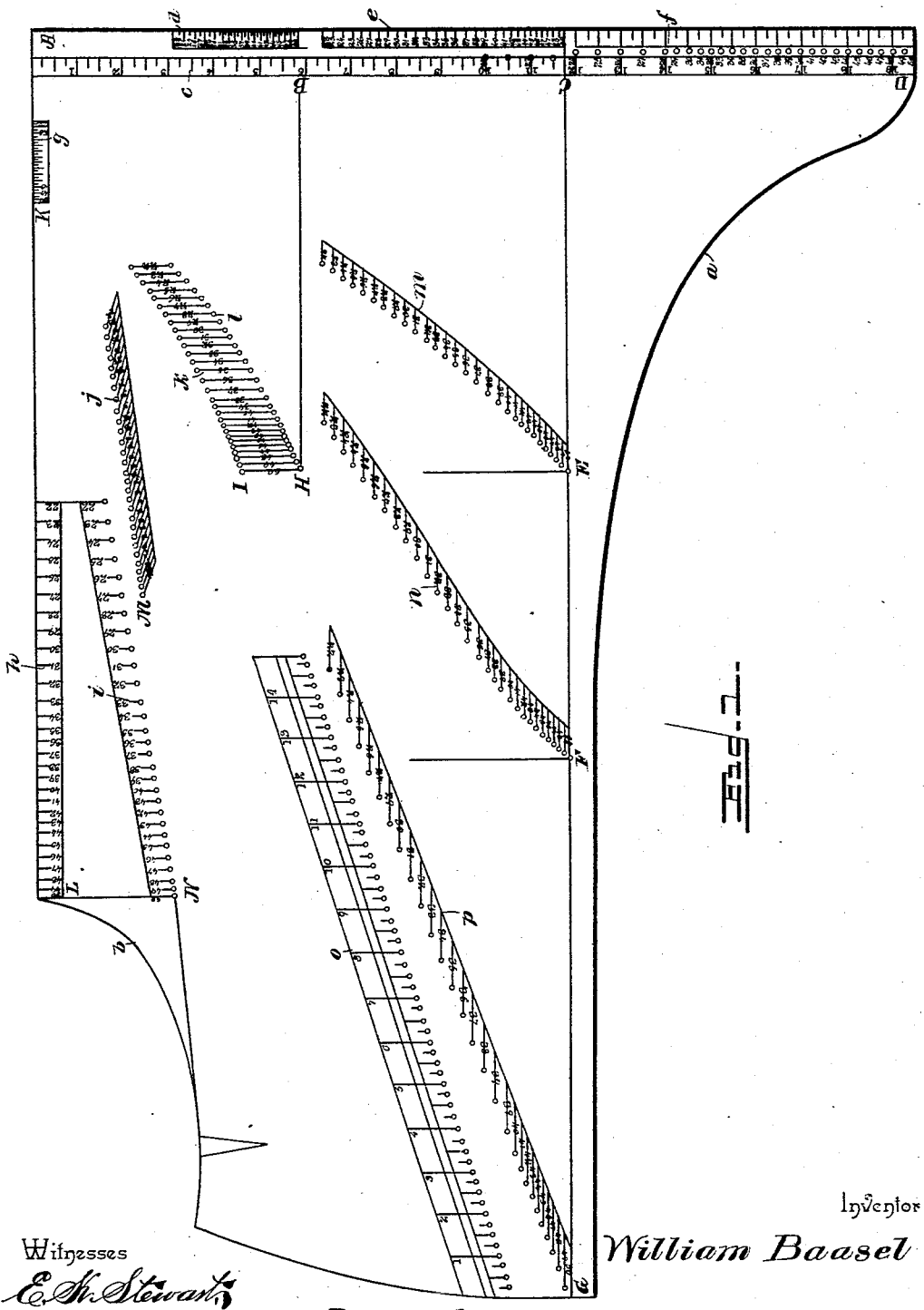

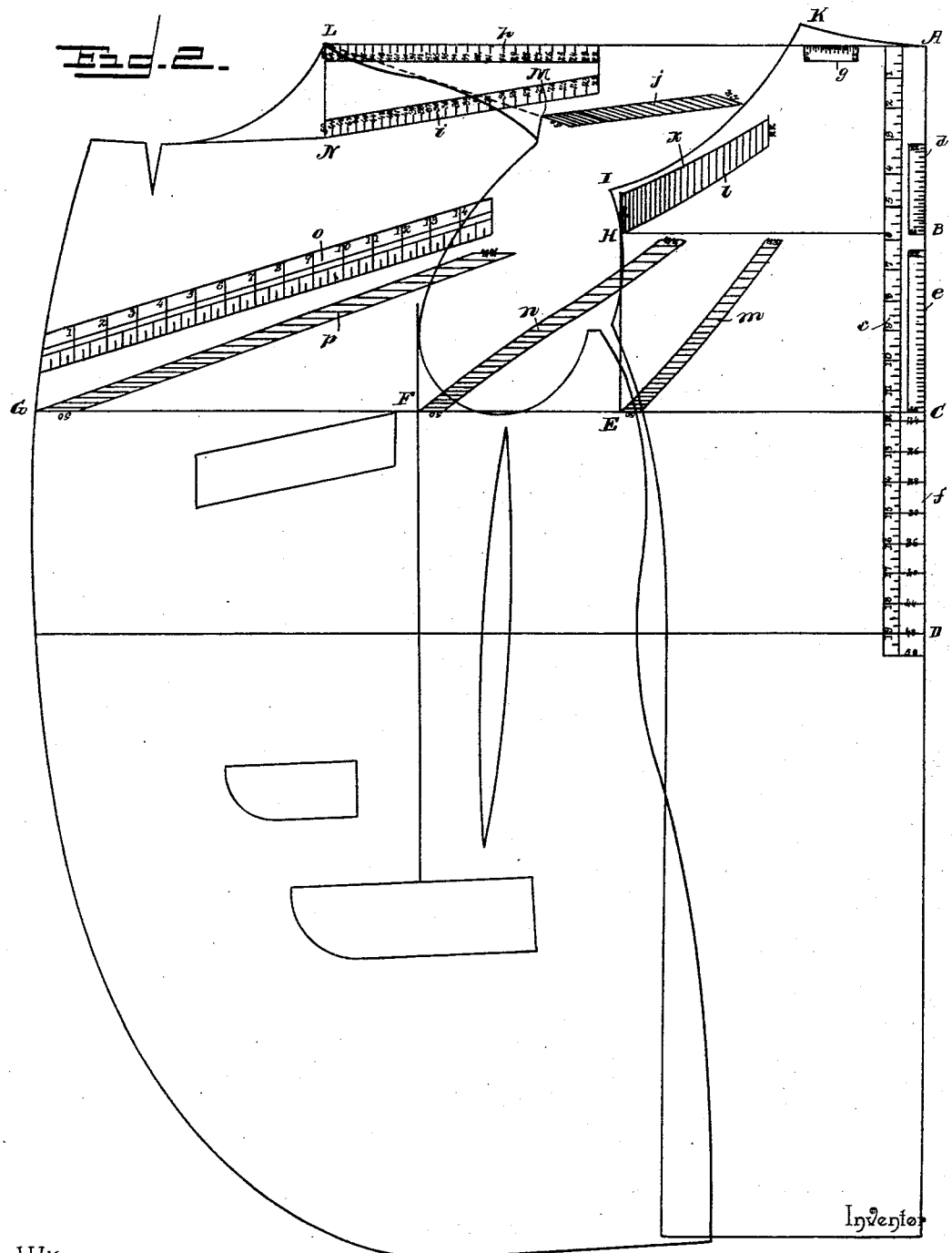

WILLIAM BAASEL, OF CHICAGO, ILLINOIS.

TAILOR'S CUTTING-CHART.

SPECIFICATION forming part of Letters Patent No. 570,834, dated November 3, 1896.

Application filed March 12, 1896. Serial No. 582,917. (No model.)

*To all whom it may concern:*

Be it known that I, WILLIAM BAASEL, a citizen of the United States, residing at Chicago, in the county of Cook and State of Illinois, have invented a new and useful Cutting-Chart, of which the following is a specification.

Garment-cutters when furnished with certain points can readily lay off the required pattern, since the general outline of the human form is the same.

The object of this invention is to enable the correct location of the points for a garment of required stock size without requiring any calculating, thereby enabling dealers and others to cut their own block-patterns.

The invention consists of a chart or diagram having scales along two of its edges and within its body so disposed as to enable the correct positioning of the primary points upon the goods, so that a pattern of desired size can be outlined and cut; and in order that a full knowledge of the invention may be obtained reference is to be had to the following description and the accompanying drawings, in which corresponding and like parts are designated by the same reference-characters.

Figure 1 is a plan view of the improved chart or diagram. Fig. 2 is a diagrammatical view showing the manner of locating the primary points and laying off the pattern or garment therefrom.

The top and right-hand edges of the chart or diagram are straight, the left-hand edge is slightly curved, the bottom edge extends on a straight line for about three-fourths of the length of the chart from the left-hand edge and then curves rapidly for the remaining one-fourth of the distance to the right-hand edge, as shown at $a$, and the upper left-hand corner is cut away on a curved line $b$, forming the neck-opening. A scale $c$, graduated in inches and the fractional parts thereof, is located adjacent to the right-hand edge of the chart and is for determining the length of the waist. Other scales $d$, $e$, and $f$ are located along the right-hand edge of the chart and locate, respectively, the points corresponding to the half of back, depth of back, and short waist. A scale $g$ is provided at the top edge a short distance to the left of the right-hand edge of the chart and determines the position of the point corresponding to the width of the back. A scale $h$ at the top edge of the chart extends to the right from the neck curve $b$ and enables the neck-point to be correctly located. A scale $i$ is arranged immediately below the scale $h$ and determines the depth of the neck-gore and extends obliquely to the top edge of the chart. A scale $j$ extends about parallel with the scale $i$ and projects to the right thereof and determines the shoulder-point. Scales $k$ and $l$ are located immediately below the scale $j$ and curve slightly in their length and extend obliquely with respect to the top edge of the chart and determine the points corresponding to the height of back and the center of back. A scale $m$ is placed beneath the scales $k$ and $l$ and to the left of the scale $e$ and is curved and inclines and designates the point corresponding to the width of back. To the left of the scale $m$ is located a scale $n$, formed on a slightly compound curved line, and which locates the point corresponding to the arm-scye. Other scales $o$ and $p$ are located at the left-hand end of the chart and extend from the lower left-hand corner toward the upper right-hand corner and determine the points corresponding to the width of breast and the required lap when laying off double-breasted garments. The body-scales are perforated for convenience in locating the points, and the edge-scales are imperforate, since they admit of the points being readily determined.

The various scales are proportionately graduated, and corresponding graduations are similarly numbered, the numbers corresponding with the stock sizes of garments, so that when it is required to cut a garment of required size the primary points corresponding thereto can be readily determined and correctly located upon the goods to be cut. As shown, the numbers range from "22" to "50;" but it will be understood that the numbers may be varied and that the scales may be extended or curtailed, as required.

Suppose it be required to cut a garment size "50." The chart or diagram is placed upon the goods to be cut and a straight line is drawn from the points L to A and from A to B, said straight lines corresponding, respectively, to the top and right-hand edge of the chart. A point K is located about three-quarters of an inch from the top edge of the chart opposite "50" on the scale $g$ and determines the width of the back at the top. The points B, C, and D are located along the right-hand edge of the chart opposite the scales $d$, $e$, and $f$ to designate the half-back, depth of back, and short waist. The points I and H are determined by the scales $k$ and $l$ and fix the height of back and the center of back. By having reference to scale $m$ the point E is marked and fixes the width of back on a line corresponding with the lowest part of the arm-scye. The point F being determined by the scale $n$ determines the width of the arm-scye. The point G is designated by the scale $p$ and indicates the width of the breast. The point M for locating the shoulder is fixed by means of the scale $j$, and the point N for designating the depth of the neck opening or gore is fixed by means of the scale $i$, and the point L, previously referred to and located on the scale $h$, determines the neck-opening. The vertical side or edge lines are extended on the required lines to produce a skirt of required length and pattern. The various points, located substantially in the manner set forth, are connected as shown to produce the required garment. The chart or diagram enables the back and front of one side of the garment to be properly cut, the other side being cut the reverse of that delineated by means of the chart, as will be readily understood.

In the art of tailoring it is the universal custom to make measurements and calculations from right-angularly-disposed straight lines or edges, from which other straight lines are projected and intersect at points which when joined determine the outline of the required pattern. The present chart embodies and is constructed on this principle as a basis, and the various scales are related, so that lines projected vertically and horizontally will pass through like graduations of corresponding scales, and thereby indicate the position of the primary points resorted to for delineating the outline of the required pattern. This is clear from the diagrammatical view, Fig. 2, which shows some of the lines projected and intersecting.

In order to attain the full benefits of the invention, the scales $e$, $m$, $n$, and $p$ are disposed in horizontal alinement and are of like depth, reckoning vertically, like graduations being on the same horizontal line, so that if a straight line be projected laterally across the chart from the edge bearing the scale $e$ it will pass through similar graduations. The scales $d$ and $l$ are likewise in horizontal alinement and of the same vertical depth, and the scales $h$ and $i$ aline vertically and are of equal length, and the same is true of the scales $k$, $l$, and $m$, which are in vertical alinement and of the same lateral extent. Hence it will be seen that the various scales coöperate, and vertical and horizontal lines projected thereby intersect at points which result, when properly united, in drafting the desired outline or pattern.

Having thus described the invention, what is claimed as new is—

1. In a tailor's measure, the combination of a chart having a straight edge, a scale $e$ at the said straight edge, and other scales $m$, $n$ and $p$ disposed in horizontal alinement with the scale $e$ and in different relative vertical planes, all the scales being similarly graduated and of corresponding vertical extent or depth, substantially as and for the purpose set forth.

2. In a tailor's measure, the combination of a chart having straight edges arranged relatively at right angles, scales $d$ and $e$ at one edge, scales $m$, $n$ and $p$ alining horizontally with and of equal vertical depth to the scale $e$, scale $l$ alining horizontally with and equal in vertical depth to the scale $d$, and scale $k$ alining vertically with the scales $l$ and $m$ and of equal lateral extent, substantially as and for the purpose set forth.

3. A tailor's chart having right-angularly-disposed straight edges, scales $h$ and $g$ at one edge for determining the neck-points, scales $d$, $e$ and $f$ at the other edge for indicating the half-back, depth of back, and waist-line, scales $m$, $n$ and $p$ in horizontal alinement with and of the same vertical depth as the scale $e$ and coöperating therewith to determine the breast-measure, arm-scye, and width of back, scale $l$ in horizontal alinement with the scale $d$ and of equal depth therewith, scale $k$ about parallel with and equal in lateral extent to the scale $l$ and coöperating therewith to indicate the height of shoulder, and horizontally-alining scales $i$ and $j$ of like vertical depth for determining the depth of neck-gore and front shoulder, respectively, the scale $i$ being equal in lateral extent to the scale $h$ and corresponding therewith vertically, and the scales $k$, $l$ and $m$ alining vertically and of equal lateral extent, the parts being combined, arranged and operating substantially as shown for the purpose described.

In testimony that I claim the foregoing as my own I have hereto affixed my signature in the presence of two witnesses.

WILLIAM BAASEL.

Witnesses:
ROBERT A. GRUBBS,
J. S. PEEBLES.